June 26, 1951   F. A. LEISEN   2,558,185
AIR CLEANER AND ELEMENT THEREFOR
Filed Jan. 31, 1948
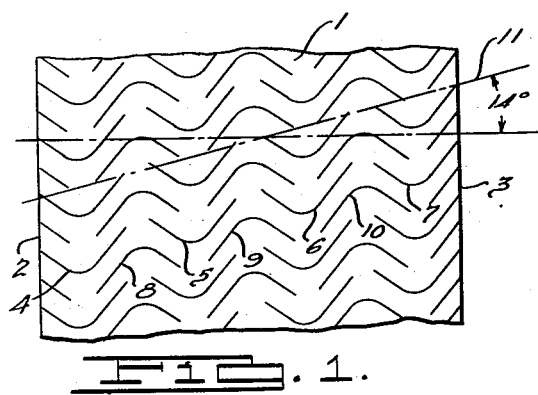
FIG. 1.
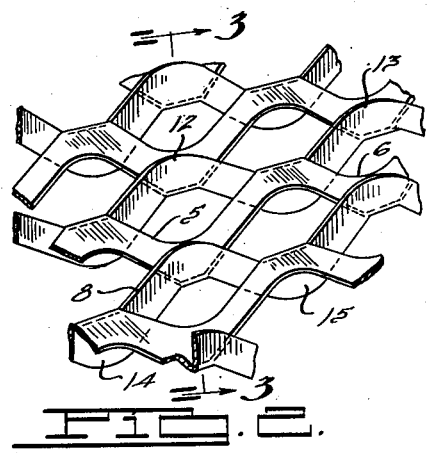
FIG. 2.
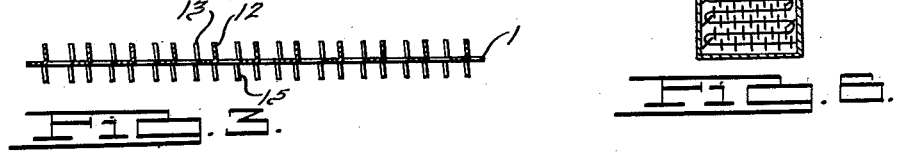
FIG. 3.
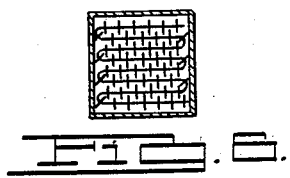
FIG. 6.
FIG. 4.
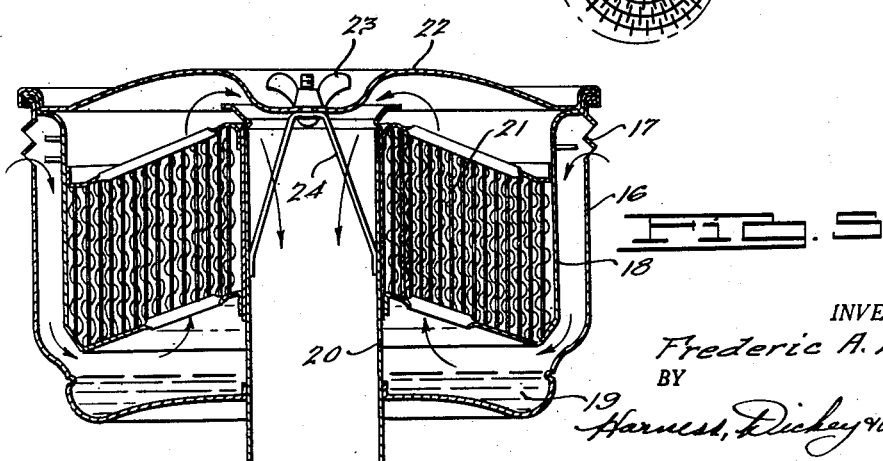
FIG. 5.
INVENTOR.
Frederic A. Leisen.
BY
Harness, Dickey & Pierce.
ATTORNEYS.

Patented June 26, 1951

2,558,185

UNITED STATES PATENT OFFICE 2,558,185

AIR CLEANER AND ELEMENT THEREFOR

Frederic A. Leisen, Grosse Pointe Farms, Mich.

Application January 31, 1948, Serial No. 5,529

8 Claims. (Cl. 183—69)

The present invention relates to an improved slit expansible metal sheet in strip form, particularly adapted for use as an element of an air cleaner or filter, and to a liquid bath air cleaner incorporating such an element.

In those air cleaners which separate foreign material from the air by bringing the air into contact with a liquid, it is customary to provide a separating element in the discharge passageway of the unit, which separating element performs the function of removing entrained liquid from the air. This element in operation becomes coated with the liquid, either oil or water, and when so coated co-operates in removing any residual entrained dust or foreign matter. A wide variety of materials has been proposed for use as such cleaner elements, but the material most widely used consists in a mass of crimped copper or aluminum wire. In the form of oil bath air cleaners commonly used on motor vehicles, the crimped wire is wound more or less loosely around a central core element to produce the desired mass through which the air is drawn after it contacts the oil bath. While this material, and particularly the crimped aluminum wire, is satisfactory from a performance standpoint, it is relatively expensive and, in addition, because of its low strength, must be enclosed within an independent casing to facilitate shipment and handling before it is installed within the air cleaner. This is particularly true in the case of replacement elements.

It is the general object of the present invention to provide an improved material for use in making air filter elements of the type mentioned, which material is characterized by its low cost, ease of shipment and handling, and relatively greater strength than the elements hitherto employed.

Other objects and advantages of the invention will become apparent from the following specification, the accompanying drawing and the appended claims.

In the drawing:

Figure 1 is a plan view of a fragmentary portion of a sheet metal strip slit in accordance with the preferred form of the invention;

Figure 2 is an enlarged fragmentary perspective view of a portion of the sheet illustrated in Figure 1 after it has been expanded by longitudinal tension;

Figure 3 is a section taken on the line 3—3 of Figure 2;

Figure 4 is a diagrammatic illustration of the expanded sheet rolled into a helical coil for use as the element of an air cleaner;

Figure 5 is a sectional view of an oil bath type of air cleaner incorporating the improved element; and Figure 6 illustrates an alternative method of employing the expanded metal sheet.

In accordance with the present invention, a substantial saving in cost is achieved by forming an air cleaner element of expanded sheet metal, as contrasted with crimped wire or other materials previously employed. The preferred material is aluminum foil, which may be of any desired thickness but is preferably sufficiently thick to support itself and permit handling when it is wound in a spiral coil.

In accordance with the present invention, performance comparable to that obtained with a conventional crimped wire element is achieved by the use of a novel pattern of slits formed in a strip of foil or sheet metal.

As best shown in Figure 1, a strip 1 of foil or sheet metal having parallel side edges 2 and 3 is provided with a pattern of slits which may roughly be described as a double herringbone pattern. Thus, each slit is generally of a shallow V form and the slits are arranged in transverse rows with the apexes of all of the slits in each row pointing longitudinally of the strip and in the same direction while the slits of each pair of adjacent rows have their apexes pointing in opposite directions and so arranged that the apex of each slit lies transversely between two slits of the next adjacent row. As shown in Figure 1, one row of slits consists of the slits 4, 5, 6 and 7, the apexes of each pointing downwardly along the length of the strip 1. Below that row is a second row, consisting of slits 8, 9 and 10, the apexes of which point upwardly along the length of the strip. It may also be noted that the apex of slit 8 lies between the slits 4 and 5 in a direction transversely of the slit. This pattern is repeated continuously throughout the entire length of the strip, and it will be understood that the strip may be of any desired length. In all cases, the length of the strip will be substantially greater than its width. It will also be appreciated that the number of slits in each transverse row may be varied as desired but will ordinarily be very substantially greater than the number illustrated in Figure 1, in which the size of each slit is greatly enlarged to facilitate illustration. For example, satisfactory results may be obtained with slits which measure approximately three-eighths to a half inch in extreme transverse width and are otherwise proportioned as illustrated in Figure 1.

An important feature of the pattern slits resides in the fact that the transverse rows do not extend in a direction perpendicular to the side edges of the strip, but, on the contrary, extend at an acute angle to such perpendicular, as indicated by the dotted line 11 in Figure 1. In the preferred embodiment of the invention illustrated, the angle between a perpendicular to the side edges and each row of slits is fourteen degrees, but this angle may be varied within relatively wide limits, as indicated hereinafter in greater detail.

When a strip of foil or sheet metal is slit in accordance with the pattern illustrated in Figure 1 thereafter stretched longitudinally, the material is expanded into a form indicated in a general way in Figures 2 and 3, to produce an expanded metal sheet having a plurality of projections which extend at a substantial angle to the general plane of the strip in both directions, these projections consisting of the portions of the sheet which lie within each V-shaped slit. Thus, the portions of material which lie between the two legs of the V-shaped slits 4, 5, 6 and 7 will project upwardly from the general plane of the sheet, as indicated by the upward projection 12 illustrated in Figure 2, formed by the material lying between the legs of slit 5, and the similar upward projection 13, formed by the material lying between the legs of slit 6. At the same time, the material which lies between the legs of the slits in the next row, namely slits 8, 9 and 10, will form downward projections, such as the projections 14 and 15 illustrated in Figure 2. The resulting sheet, when viewed from the edge, has an appearance generally similiar to that illustrated in Figure 3. The angle between the projections 12, 13, 14, 15, etc., and the general plane of the strip may be varied to some extent by controlling the amount of longitudinal expansion of the strip, but the strip is so expanded that the projections extend at an angle in excess of forty-five degrees to the general plane.

That portion of the material lying between adjacent parallel sides of two different slits forms a sinuous transverse strip which lies approximately in the general plane of the strip but will undulate to some degree back and forth across the general plane.

One advantage of the slit pattern illustrated in the drawing and above described is that longitudinal expansion of the strip produces very little reduction in the width of the strip.

When the expanded strip is coiled into a spiral, as indicated in diagrammatic manner in Figure 4, the projections space successive layers of the coil and form a plurality of passages between successive layers extending more or less axially through the coil for the passing of air. In this connection, it should be noted that while it is desirable to provide for relatively free passage of the air through the element, it is undesirable to have any openings of substantial size through which the air may travel in a straight line. The form which the strip assumes when expanded produces considerable distortion of the general plane of the strip and thus acts to laterally deflect the air and prevent it from traveling straight through the coil parallel to the axis of the coil. In addition, the arrangement of the transverse rows of slits at an acute angle, as illustrated in Figure 1, is of major importance in that it results in locating the projections produced by each row of slits in a helical path, thus further interfering with the straight-through flow of the air. While the angle between each row of slits and a perpendicular to the side edge of the strip may vary, it should be an acute angle substantially less than forty-five degrees in order to facilitate longitudinal expansion of the strip. Also, the angle should not be so great that the longitudinal displacement of two adjacent slits in the same transverse row equals the longitudinal displacement between two adjacent slits the apexes of which point in the same direction and which are located in the same longitudinal row, since otherwise when the strip is coiled in a spiral the projections will not be properly staggered or helically aligned.

The application of the improved element to a more or less conventional oil bath type of air cleaner such as is commonly employed on motor vehicles is illustrated in Figure 5. As there shown, the air cleaner consists of a casing 16 having an air inlet 17. An inner casing member 18 is spaced from the walls of the outer casing and forms an annular inlet passageway effective to direct the entering air downwardly against or below the surface of a bath of oil 19 in the bottom of the casing 16. The air is then directed upwardly through an annular space between the inner casing 18 and a central discharge tube 20. The cleaner element 21, which consists of a spiral coil of the expanded metal strip, is positioned in the latter annular space surrounding the discharge tube 20. Thus, the air passes upwardly through the coil and is thereafter discharged downwardly through the tube 20. The unit is provided with a removable cover 22 secured by means of the thumb nut 23 to a bracket 24 carried by the tube 20, and this cover may be removed for the purpose of replacing the element 21.

An important feature of the improved cleaner element of the present invention, particularly for use as a replacement element for air cleaners of the type illustrated in Figure 5, resides in the fact that it may be made of foil or sheet metal of sufficient stiffness to sustain itself. Consequently, it is unnecessary to provide as a part of the element an external retaining casing.

The advantages of the invention may be realized without coiling the strip in a spiral coil. For example, as shown in Figure 6, if the air passageway is square or rectangular in cross section, the strip may be folded back and forward on itself in an accordion fashion to produce a satisfactory separating element.

A further advantage of the invention is that the completed element may be readily formed from a slit strip which has not been expanded. Thus, a coiled strip which has been slit but not expanded may be readily transported and, if desired, sold as an article of commerce. It is only necessary to cut off an appropriate length, expand the strip to the desired degree, and coil or fold it into the completed element for insertion into the air cleaner.

What is claimed is:

1. A strip of sheet metal having parallel side edges and provided with a pattern of spaced slits to permit expansion by longitudinal extension of the sheet, said slits being of shallow V form with their apexes pointing longitudinally of the sheet and being disposed in transversely extending rows which extend across the sheet at an acute angle from a perpendicular to the side edges, all of the apexes of said slits in any one transverse row pointing in the same direction and those of each pair of adjacent rows pointing in the opposite direction with the apex of each slit lying between two slits of the next adjacent row, said angle being such that the longitudinal displacement of the slits at the opposite ends of the same row is at least approximately equal to the longitudinal distance between longitudinally aligned slits whose apexes point in the same direction.

2. An air cleaner separation element consisting of a spiral coil of a strip of sheet metal provided with a pattern of spaced slits and expanded longitudinally, said slits being of shallow V form with their apexes pointing longitudinally of the sheet and being disposed in transversely extending rows which extend across the sheet at an acute angle from a perpendicular to the side edges, all of the apexes of said slits in any one transverse row pointing in the same direction and those of each pair of adjacent rows pointing in the opposite direction with the apex of each slit lying between two slits of the next adjacent row, said angle being such that the longitudinal displacement of the slits at the opposite ends of the same row is at least approximately equal to the longitudinal distance between longitudinally aligned slits whose apexes point in the same direction.

3. An air cleaner separation element consisting of a plurality of layers of strip sheet metal provided with a pattern of spaced slits and expanded longitudinally, said slits being of shallow V form with their apexes pointing longitudinally of the sheet and being disposed in transversely extending rows which extend across the sheet at an acute angle from a perpendicular to the side edges, all of the apexes of said slits in any one transverse row pointing in the same direction and those of each pair of adjacent rows pointing in the opposite direction with the apex of each slit lying between two slits of the next adjacent row, said angle being such that the longitudinal displacement of the slits at the opposite ends of the same row is at least approximately equal to the longitudinal distance between longitudinally aligned slits whose apexes point in the same direction.

4. In combination, an air cleaner having a casing provided with an air passageway, and means in the air passageway for removing substances entrained in air passing therethrough, said means comprising a plurality of layers of sheet metal lying in planes parallel to the direction of air flow, said sheet metal layers having side edges extending transversely to the air flow and being provided with a pattern of spaced slits and being longitudinally expanded, said slits being of shallow V form with their apexes pointing longitudinally of the sheet and being disposed in transversely extending rows which extend across the sheet, all of the apexes of said slits in any one transverse row pointing in the same direction and those of each pair of adjacent rows pointing in the opposite direction with the apex of each slit lying between two slits of the next adjacent row, the expansion producing integral extensions projecting in opposite directions.

5. In combination, an air cleaner having an air passageway, and means in the air passageway for removing substances entrained in air passing therethrough, said means comprising a plurality of layers of sheet metal lying in planes parallel to the direction of air flow, said sheet metal layers having side edges extending transversely to the air flow and being provided with a pattern of spaced slits and being longitudinally expanded, said slits being of shallow V form with their apexes pointing longitudinally of the sheet and being disposed in transversely extending rows which extend across the sheet at an acute angle from a perpendicular to the side edges, all of the apexes of said slits in any one transverse row pointing in the same direction and those of each pair of adjacent rows pointing in the opposite direction with the apex of each slit lying between two slits of the next adjacent row, said angle being such that the longitudinal displacement of the slits at the opposite ends of the same row is at least approximately equal to the longitudinal distance between longitudinally aligned slits whose apexes point in the same direction.

6. An air cleaner separation element consisting of a spiral coil of a strip of sheet metal slit and expanded in a pattern which forms integral projections extending at a substantial angle outwardly with respect to the plane of the strip in both directions, said projections being disposed in rows which lie in a helical path in the coiled strip, the angular displacement between adjacent projections in any helical row being less than the angular displacement between adjacent helical rows.

7. An air cleaner separation element consisting of a spiral coil of a strip of sheet metal having integral projections slit and bent outwardly at a substantial angle with respect to the plane of the strip in both directions, said projections being disposed in rows which lie in a helical path in the coiled strip, the angular displacement between adjacent projections in any helical row being less than the angular displacement between adjacent helical rows.

8. An air cleaner separation element consisting of a spiral coil of a strip of sheet metal provided with a pattern of spaced slits and expanded longitudinally, said slits being of shallow V form with their apexes pointing longitudinally of the sheet and being disposed in transversely extending rows which extend across the sheet, all of the apexes of said slits in any one transverse row pointing in the same direction and those of each pair of adjacent rows pointing in the opposite direction with the apex of each slit lying between two slits of the next adjacent row, the expansion producing integral extensions projecting in opposite directions.

FREDERIC A. LEISEN.

REFERENCES CITED

The following references are of record in the file of this patent:

UNITED STATES PATENTS

| Number | Name | Date |
|---|---|---|
| 738,825 | Mallory | Sept. 15, 1903 |
| 2,037,164 | Harrah | Apr. 14, 1936 |

FOREIGN PATENTS

| Number | Country | Date |
|---|---|---|
| 228,811 | Germany | July 11, 1909 |
| 9,228 of 1911 | Great Britain | Sept. 28, 1911 |